United States Patent
Vetter et al.

(10) Patent No.: US 8,538,719 B2
(45) Date of Patent: Sep. 17, 2013

(54) METHOD FOR TESTING DEVICE DESCRIPTIONS FOR FIELD DEVICES OF AUTOMATION TECHNOLOGY

(75) Inventors: Immanuel Vetter, Sinzheim (DE); Michael Gunzert, Herxheim (DE)

(73) Assignee: CodeWrights GmbH, Karlsruhe (DE)

( * ) Notice: Subject to any disclaimer, the term of this patent is extended or adjusted under 35 U.S.C. 154(b) by 654 days.

(21) Appl. No.: 12/087,127

(22) PCT Filed: Dec. 28, 2006

(86) PCT No.: PCT/EP2006/070240
§ 371 (c)(1),
(2), (4) Date: May 26, 2009

(87) PCT Pub. No.: WO2007/077189
PCT Pub. Date: Jul. 12, 2007

(65) Prior Publication Data
US 2009/0326852 A1    Dec. 31, 2009

(30) Foreign Application Priority Data
Dec. 30, 2005  (DE) ............... 10 2005 063 162

(51) Int. Cl.
*G06F 19/00*  (2011.01)

(52) U.S. Cl.
USPC ................ 702/119; 702/120; 702/123

(58) Field of Classification Search
USPC .......... 702/35, 36, 38, 108, 119, 120, 122, 702/123, 182–185
See application file for complete search history.

(56) References Cited

U.S. PATENT DOCUMENTS

| | | | | |
|---|---|---|---|---|
| 5,920,830 A | * | 7/1999 | Hatfield et al. | 702/119 |
| 2004/0199351 A1 | | 10/2004 | Ott | |
| 2007/0088518 A1 | * | 4/2007 | Braun | 702/108 |

FOREIGN PATENT DOCUMENTS
WO  WO 2004/046837  6/2004

\* cited by examiner

*Primary Examiner* — Manuel L Barbee
(74) *Attorney, Agent, or Firm* — Bacon & Thomas, PLLC

(57) ABSTRACT

In a method for testing device descriptions for field devices of automation technology, a finite state machine is produced from a device description to serve as a basis for a test script. For testing the device description, the test script is executed, with data being sent to and received from the device description. In such case, it is tested whether desired values set in the test script agree with actual values delivered e.g. from the field device.

7 Claims, 9 Drawing Sheets

```
// DD Code Fragment of Micropilot M FMR2xx
#define HL      33999   /* Hard lock/Local lock   alt:   9999 */
#define WHG     33998   /* WHG lock               alt:   9998 */
#define VS      200     /* view service           alt:   334 */
#define CUL     100     /* customer unlock        alt:   111 */
#define SUL     300     /* service unlock         alt:   333 */
#define DUL     123     /* debug unlock           alt:   2101 */

VARIABLE parOperationCode
{
        LABEL "Operation Code"
        HANDLING IF (parOperationMode == 1)
        {
                READ;
        }
        ELSE
        {
                READ & WRITE;
        }
        TYPE UNSIGNED_INTEGER (2)
        {
                EDIT_FORMAT      "5.1U";
                DISPLAY_FORMAT   "5.1u";
                MIN_VALUE        0;
                MAX_VALUE        IF (parOperationMode == 1) {3398;} ELSE {3397;}
        }
}

VARIABLE parOperationMode
{
        LABEL "Operation Mode"
        HANDLING         READ & WRITE;
        TYPE             ENUMERATED { {0,"Standard"}, {1,"WHG"} }
}

VARIABLE parTankShape
{
        LABEL "Tank Shape"
        HANDLING IF (parOperationCode == CUL ||
            parOperationCode == SUL ||
```

Fig. 7

```
allpublic namespace Model
// general type definitions (device independent)

[ProfilerHint (FieldReadProfileable=true) ]
enum enumCLASS   // Class should be a set as a variable may belong to multiple classes
    NONE
    INPUT
    OUTPUT
    CONTAINED
    DYNAMIC
    LOCAL
    // to be continued enum enumTYPE
    ENUMERATED
    UNSIGNED_INTEGER
    FLOAT
    // to be continued

[ProfilerHint (FieldReadProfileable=true) ]
enum enumHANDLING
    READ
    WRITE
    READ_WRITE

[ProfilerHint (FieldReadProfileable=true) ]
structure RANGE of T
    MIN_VALUE as T
    MAX_VALUE as T

[ProfilerHint (FieldReadProfileable=true) ]
structure ENUM_VALUE
    VALUE as Integer - 0
    DESCRIPTION as String = " "
//       HELP as String = " "

// device specific definitions (generated automatically later on)

const HL = 33999      // Hard lock
const WHG = 33998     // WHG lock
const VS = 200        // view service
const CUL = 100       // customer unlock
const SUL = 300       // service unlock
const DUL = 123       // debug unlock //////////////////////////////////////
// VARIABLE parOperationCode
//////////////////////////////////////
[ProfilerHint (FieldReadProfileable=true) ]
class parOperationCode VAR
    var VALUE as Integer = 0
```

Generated Test Sequences

| State Transitions | | | | | | | | | |
|---|---|---|---|---|---|---|---|---|---|
| StartState | StartHyper | Action | Output | EndState | EndHyper | GroupNr | LinkNr | IsRequired | ActionGro |
| ▷ S1 | H1 | parDistanceUnit_VAR#6206.SetValue(0) | {Null} | S1 | H1 | 0 | 0 | ☑ | 26 |
| S1 | H1 | parTankShape_VAR#6288.SetValue(0) | {Null} | S1 | H1 | 0 | 1 | ☑ | 19 |
| S1 | H1 | parOperationMode_VAR#6289.SetValue(1) | {Null} | S2 | H2 | 0 | 2 | ☑ | 9 |
| S2 | H2 | parDistanceUnit_VAR#6286.SetValue(0) | {Null} | S2 | H2 | 0 | 3 | ☑ | 26 |
| S2 | H2 | parTankShape_VAR#6288.SetValue(0) | {Null} | S2 | H2 | 0 | 4 | ☑ | 19 |
| S2 | H2 | parOperationMode_VAR#6289.SetValue(1) | {Null} | S2 | H2 | 0 | 5 | ☑ | 9 |
| S2 | H2 | parOperationMode_VAR#6289.SetValue(0) | {Null} | S1 | H1 | 0 | 6 | ☑ | 8 |
| S2 | H2 | parOperationCode_VAR#6290.SetValue(33998) | {Null} | S3 | H3 | 0 | 7 | ☑ | 7 |
| S3 | H3 | parDistanceUnit_VAR#6286.SetValue(0) | {Null} | S3 | H3 | 0 | 8 | ☑ | 26 |
| S3 | H3 | parTankShape_VAR#6288.SetValue(0) | {Null} | S3 | H3 | 0 | 9 | ☑ | 19 |
| S3 | H3 | parOperationMode_VAR#6289.SetValue(10) | {Null} | S4 | H4 | 0 | 10 | ☑ | 18 |
| S4 | H4 | parDistanceUnit_VAR#6286.SetValue(0) | {Null} | S4 | H4 | 0 | 11 | ☑ | 26 |
| S4 | H4 | parTankShape_VAR#6288.SetValue(0) | {Null} | S4 | H4 | 0 | 12 | ☑ | 19 |
| S4 | H4 | parOperationMode_VAR#6289.SetValue(10) | {Null} | S4 | H4 | 0 | 13 | ☑ | 18 |
| S4 | H4 | parOperationMode_VAR#6289.SetValue(1) | {Null} | S3 | H3 | 0 | 14 | ☑ | 9 |
| S4 | H4 | parOperationCode_VAR#6290.SetValue(33998) | {Null} | S4 | H4 | 0 | 15 | ☑ | 7 |
| S4 | H4 | parOperationCode_VAR#6290.SetValue(300) | {Null} | S5 | H5 | 0 | 16 | ☑ | 5 |
| S5 | H5 | parDistanceUnit_VAR#6286.SetValue(0) | {Null} | S5 | H5 | 0 | 17 | ☑ | 26 |
| S5 | H5 | parTankShape_VAR#6288.SetValue(0) | {Null} | S5 | H5 | 0 | 18 | ☑ | 19 |
| S5 | H5 | parOperationMode_VAR#6289.SetValue(10) | {Null} | S5 | H5 | 0 | 19 | ☑ | 18 |
| S5 | H5 | parOperationMode_VAR#6289.SetValue(1) | {Null} | S6 | H6 | 0 | 20 | ☑ | 9 |
| S6 | H6 | parDistanceUnit_VAR#6286.SetValue(0) | {Null} | S6 | H6 | 0 | 21 | ☑ | 26 |
| S6 | H6 | parTankShape_VAR#6288.SetValue(0) | {Null} | S6 | H6 | 0 | 22 | ☑ | 19 |
| S6 | H6 | parOperationMode_VAR#6289.SetValue(10) | {Null} | S5 | H5 | 0 | 23 | ☑ | 18 |
| S6 | H6 | parOperationMode_VAR#6289.SetValue(1) | {Null} | S6 | H6 | 0 | 24 | ☑ | 9 |
| S6 | H6 | parOperationCode_VAR#6290.SetValue(33998) | {Null} | S3 | H3 | 0 | 25 | ☑ | 7 |
| S6 | H6 | parOperationCode_VAR#6290.SetValue(300) | {Null} | S6 | H6 | 0 | 26 | ☑ | 5 |
| S6 | H6 | parOperationCode_VAR#6290.SetValue(100) | {Null} | S7 | H7 | 0 | 27 | ☑ | 2 |
| S7 | H7 | parDistanceUnit_VAR#6286.SetValue(0) | {Null} | S7 | H7 | 0 | 28 | ☑ | 26 |
| S7 | H7 | parTankShape_VAR#6288.SetValue(0) | {Null} | S7 | H7 | 0 | 29 | ☑ | 19 |
| S7 | H7 | parOperationMode_VAR#6289.SetValue(10) | {Null} | S8 | H8 | 0 | 30 | ☑ | 18 |
| S8 | H8 | parDistanceUnit_VAR#6286.SetValue(0) | {Null} | S8 | H8 | 0 | 31 | ☑ | 26 |
| S8 | H8 | parTankShape_VAR#6288.SetValue(0) | {Null} | S8 | H8 | 0 | 32 | ☑ | 19 |
| S8 | H8 | parOperationMode_VAR#6289.SetValue(10) | {Null} | S8 | H8 | 0 | 33 | ☑ | 18 |
| S8 | H8 | parOperationMode_VAR#6289.SetValue(1) | {Null} | S7 | H7 | 0 | 34 | ☑ | 9 |
| S8 | H8 | parOperationCode_VAR#6290.SetValue(33998) | {Null} | S4 | H4 | 0 | 35 | ☑ | 7 |
| S8 | H8 | parOperationCode_VAR#6290.SetValue(300) | {Null} | S5 | H5 | 0 | 36 | ☑ | 5 |
| S8 | H8 | parOperationCode_VAR#6290.SetValue(100) | {Null} | S8 | H8 | 0 | 37 | ☑ | 2 |
| S7 | H7 | parOperationMode_VAR#6289.SetValue(1) | {Null} | S7 | H7 | 0 | 38 | ☑ | 9 |
| S7 | H7 | parOperationCode_VAR#6290.SetValue(33998) | {Null} | S3 | H3 | 0 | 39 | ☑ | 7 |
| S7 | H7 | parOperationCode_VAR#6290.SetValue(300) | {Null} | S6 | H6 | 0 | 40 | ☑ | 5 |
| S7 | H7 | parOperationCode_VAR#6290.SetValue(100) | {Null} | S7 | H7 | 0 | 41 | ☑ | 2 |
| S7 | H7 | parOperationCode_VAR#6290.SetValue(0) | {Null} | S2 | H2 | 0 | 42 | ☑ | 1 |
| S6 | H6 | parOperationCode_VAR#6290.SetValue(0) | {Null} | S2 | H2 | 0 | 43 | ☑ | 1 |

```
sequence #0 ( 1 steps) from initial state
    parOperationMode_VAR#6289.SetValue(1): void (from S1 to S2)
sequence #1 ( 2 steps) from initial state
    parOperationMode_VAR#6289.SetValue(1): void (from S1 to S2)
    parOperationMode_VAR#6289.SetValue(0): void (from S2 to S1)
sequence #2 ( 2 steps) from initial state
    parOperationMode_VAR#6289.SetValue(1): void (from S1 to S2)
    parOperationCode_VAR#6290.SetValue(33998): void (from S2 to S3)
sequence #3 ( 3 steps) from initial state
    parOperationMode_VAR#6289.SetValue(1): void (from S1 to S2)
    parOperationCode_VAR#6290.SetValue(33998): void (from S2 to S3)
    parOperationMode_VAR#6289.SetValue(10): void (from S3 to S4)
sequence #4 ( 4 steps) from initial state
    parOperationMode_VAR#6289.SetValue(1): void (from S1 to S2)
    parOperationCode_VAR#6290.SetValue(33998): void (from S2 to S3)
    parOperationMode_VAR#6289.SetValue(10): void (from S3 to S4)
    parOperationMode_VAR#6289.SetValue(1): void (from S4 to S3)
sequence #5 ( 4 steps) from initial state
    parOperationMode_VAR#6289.SetValue(1): void (from S1 to S2)
    parOperationCode_VAR#6290.SetValue(33998): void (from S2 to S3)
    parOperationMode_VAR#6289.SetValue(10): void (from S3 to S4)
    parOperationCode_VAR#6290.SetValue(300): void (from S4 to S5)
sequence #6 ( 4 steps) from initial state
    parOperationMode_VAR#6289.SetValue(1): void (from S1 to S2)
    parOperationCode_VAR#6290.SetValue(300): void (from S2 to S6)
    parOperationMode_VAR#6289.SetValue(10): void (from S6 to S5)
    parOperationMode_VAR#6289.SetValue(1): void (from S5 to S6)
sequence #7 ( 3 steps) from initial state
    parOperationMode_VAR#6289.SetValue(1): void (from S1 to S2)
    parOperationCode_VAR#6290.SetValue(300): void (from S2 to S6)
    parOperationCode_VAR#6290.SetValue(33998): void (from S6 to S3)
sequence #8 ( 3 steps) from initial state
    parOperationMode_VAR#6289.SetValue(1): void (from S1 to S2)
    parOperationCode_VAR#6290.SetValue(300): void (from S2 to S6)
    parOperationCode_VAR#6290.SetValue(100): void (from S6 to S7)
sequence #9 ( 3 steps) from initial state
    parOperationMode_VAR#6289.SetValue(1): void (from S1 to S2)
    parOperationCode_VAR#6290.SetValue(100): void (from S2 to S7)
    parOperationMode_VAR#6289.SetValue(10): void (from S7 to S8)
sequence #10 ( 4 steps) from initial state
    parOperationMode_VAR#6289.SetValue(1): void (from S1 to S2)
    parOperationCode_VAR#6290.SetValue(100): void (from S2 to S7)
    parOperationMode_VAR#6289.SetValue(10): void (from S7 to S8)
    parOperationMode_VAR#6289.SetValue(1): void (from S8 to S7)
sequence #11 ( 4 steps) from initial state
    parOperationMode_VAR#6289.SetValue(1): void (from S1 to S2)
    parOperationCode_VAR#6290.SetValue(100): void (from S2 to S7)
    parOperationMode_VAR#6289.SetValue(10): void (from S7 to S8)
    parOperationCode_VAR#6290.SetValue(33998): void (from S8 to S4)
sequence #12( 4 steps) from initial state
    parOperationMode_VAR#6289.SetValue(1): void (from S1 to S2)
```

Fig. 10

METHOD FOR TESTING DEVICE DESCRIPTIONS FOR FIELD DEVICES OF AUTOMATION TECHNOLOGY

TECHNICAL FIELD

The invention relates to a method for testing device descriptions for field devices of automation technology, wherein device descriptions are integrated into an operating program for servicing field devices.

BACKGROUND DISCUSSION

Field devices are commonly employed in automation technology (process automation/manufacturing automation). They serve for registering and/or influencing process variables. Examples of such field devices for process automation technology are fill level measuring devices, mass flow measuring devices, pressure- and temperature-measuring devices, pH- and redox-potential-measuring devices, conductivity measuring devices, etc., which, as sensors, register the corresponding process variables, fill level, flow, e.g. flow rate, pressure, temperature, pH-value and conductivity value, respectively.

Serving as field devices for influencing process variables are actuators, e.g. valves, which control flow of a liquid in a section of pipeline, or pumps, which change fill level in a container.

A large number of such field devices are manufactured and sold by the firm, Endress+Hauser®.

Frequently, field devices are connected with superordinated units via communication systems (Profibus®, Foundation®-fieldbus, HART®, etc.). The superordinated units serve for process control, process visualization, device-management (configuration and servicing) and for plant management (asset management), using corresponding application programs.

The integration of field devices into such applications occurs via device descriptions. Device descriptions are provided by device manufacturers, in order that superordinated units can recognize and interpret the meaning of data supplied by the field devices.

Various device descriptions are known for the different fieldbus systems (HART-device-descriptions, Fieldbus Foundation device descriptions, Profibus device descriptions).

On the basis of cooperation of Fieldbus Foundation (FF), HART Communication Foundation (HCF) and Profibus Nutzerorganisation (Profibus User Organization, known under the acronym, PNO), an electronic device description (Electronic Device Description EDD) was created, which is defined in the standard, IEC 61804-2.

With a large number of EDD-based fieldbus systems (FF, HART, Profibus) installed worldwide, EDD is an important and very widely used description language for device descriptions in automation technology.

For servicing field devices, corresponding servicing programs (operating tools) are necessary, which, in superordinated units, run either on their own (Endress+Hauser Field-Care, Pactware, AMS Fisher-Rosemount, PDM Siemens) or else are integrated into control system applications (Siemens PCS7, ABB Symphony, Emerson Delta V).

For a comprehensive servicing of field devices, newly, special device descriptions, so-called DTMs (Device Type Manager), are available, which correspond to the FDT (Field Device Tool) specifications. The FDT-specifications, serving as an industry standard, were developed by the PNO in cooperation with ZVEI (Zentralverband Elektrotechnik-und Elektroindustrie (The German Electrical and Electronics Industry, a registered association)). The current FDT-Specification 1.2.1, including the Addendum for "Foundation Fieldbus" Communication, is available from ZVEI, PNO or the FDT-Group.

Many field device manufacturers already deliver corresponding DTMs for their field devices. The DTMs encapsulate all variables and functions of the pertinent field device and offer, most often, a graphical user interface for servicing the devices. Device-specific device descriptions can already be downloaded via Internet-connections from the servers of corresponding device manufacturers.

With the help of DTMs, a device- and manufacturer-spanning servicing of field devices is possible with appropriate operating programs.

As run-time environment, the DTMs require a frame application (FDT-Frame). The frame application and the corresponding DTMs permit, thus, a very comfortable access to various variables of the field devices (e.g. to device parameters, measured values, diagnostic information, status information, etc.), as well as serving for invoking special functions, which individual DTMs make available.

Frame applications and DTMs work according to the client-server-principle.

Since the field devices are serviced via DTMs, extensive function testing is necessary, in order to assure that the DTMs work faultlessly.

This function testing has also, especially, an aspect, which is critical for safety, since safety-critical settings on field devices are effected with DTMs.

One possibility for testing DTMs is offered by the test tool dtmINSPECTOR (M&M Software GmbH, St. Georgen). For this, comprehensive test scripts are written, which are executed together with the DTM to be tested. Essentially, in these tests, it is reviewed, whether the DTM meets the FDT-specifications, thus the FDT interface definitions. The correct functioning of the DTMs as regards the device functionality is, however, not checked in such case.

The test scripts for the dtmINSPECTOR are produced individually by hand. Typical test cases based on the FDT-specifications are assembled and transformed into test scripts.

CodeWrights GmbH (Karlsruhe) produces from conventional device description files (HART, FF or Profibus), with the help of a tool (DTMstudio®) for such purpose, device-specific DTMs in large numbers. For each separate DTM, a special test script is manually produced, which, besides the interface testing, also includes testing of the device functionality. This is extremely time consuming and cost-intensive.

The more parameters a field device includes, the higher the test effort becomes. Complex field devices can, today, already have up to 1000 parameters, and more.

SUMMARY OF THE INVENTION

An object of the invention is, therefore, to provide a method for testing device descriptions for field devices of automation technology, not having the above-described disadvantages, while permitting, especially, the simple production of test scripts, with the test scripts covering, as much as possible, all conceivable test cases for the relevant field device.

This object is achieved by a method which produces a finite state machine from a device description based on states and state transitions, produces a test script with help of the finite state machine, executes the test script, wherein data are sent to and received from the device description for generating actual values, and then compares desired values predetermined by the test script with the actual values.

BRIEF DESCRIPTION OF THE DRAWINGS

The invention will now be explained in greater detail on the basis of several examples of embodiments presented in the drawing, the figures of which show as follows:

FIG. 7 shows a device description file of Micropilot M (an extract thereof);

FIG. 8 shows a abstract state machine (an extract thereof);

FIG. 9 shows a finite state automat (an extract thereof); and

FIG. 10 shows a test sequence (an extract thereof).

DETAILED DISCUSSION

Figure 1:
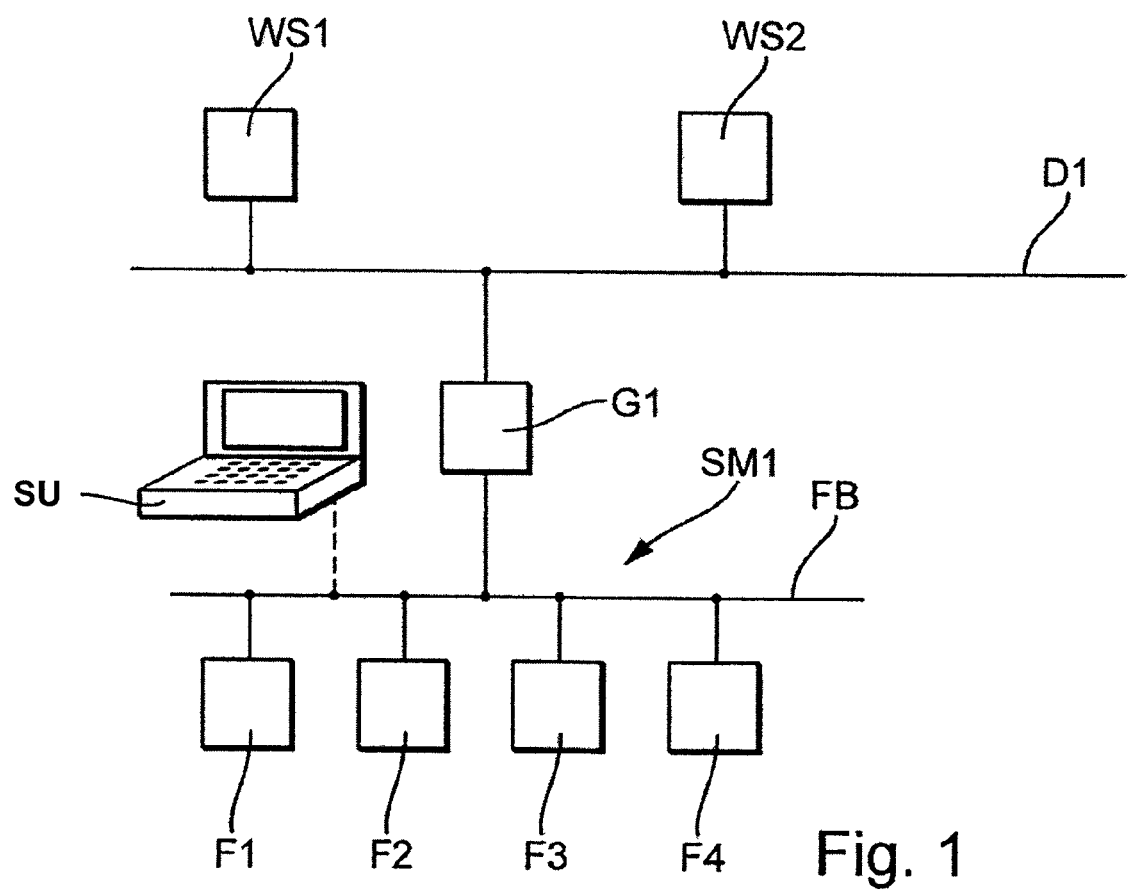
FIG. 1 is a schematic drawing of a network of automation technology with a plurality of field devices.

FIG. 1 shows a communication network of process automation technology. Connected to a data bus D1 are a plurality of computer units (work stations, host-computer) WS1, WS2. These computer units can serve as superordinated units (control system, control unit, servicing station) for process visualizing, process monitoring and for engineering, as well as also for servicing and monitoring field devices. Data bus D1 works e.g. according to the Profibus® DP-Standard or the HSE (High Speed Ethernet)-Standard of Foundation® Fieldbus. Via a gateway G1, which is also referred to as a linking device or a segment coupler, the data bus D1 is connected with a fieldbus segment SM1. Field bus segment SM1 is composed of a plurality of field devices F1, F2, F3, F4 connected together via a fieldbus FB. Field devices F1, F2, F3, F4 can be both sensors or actuators. Fieldbus FB works according to one of the known communication standards Profibus, Foundation Fieldbus or HART. Also connectable temporarily with fieldbus FB is a portable computer unit SU.

Figure 2:
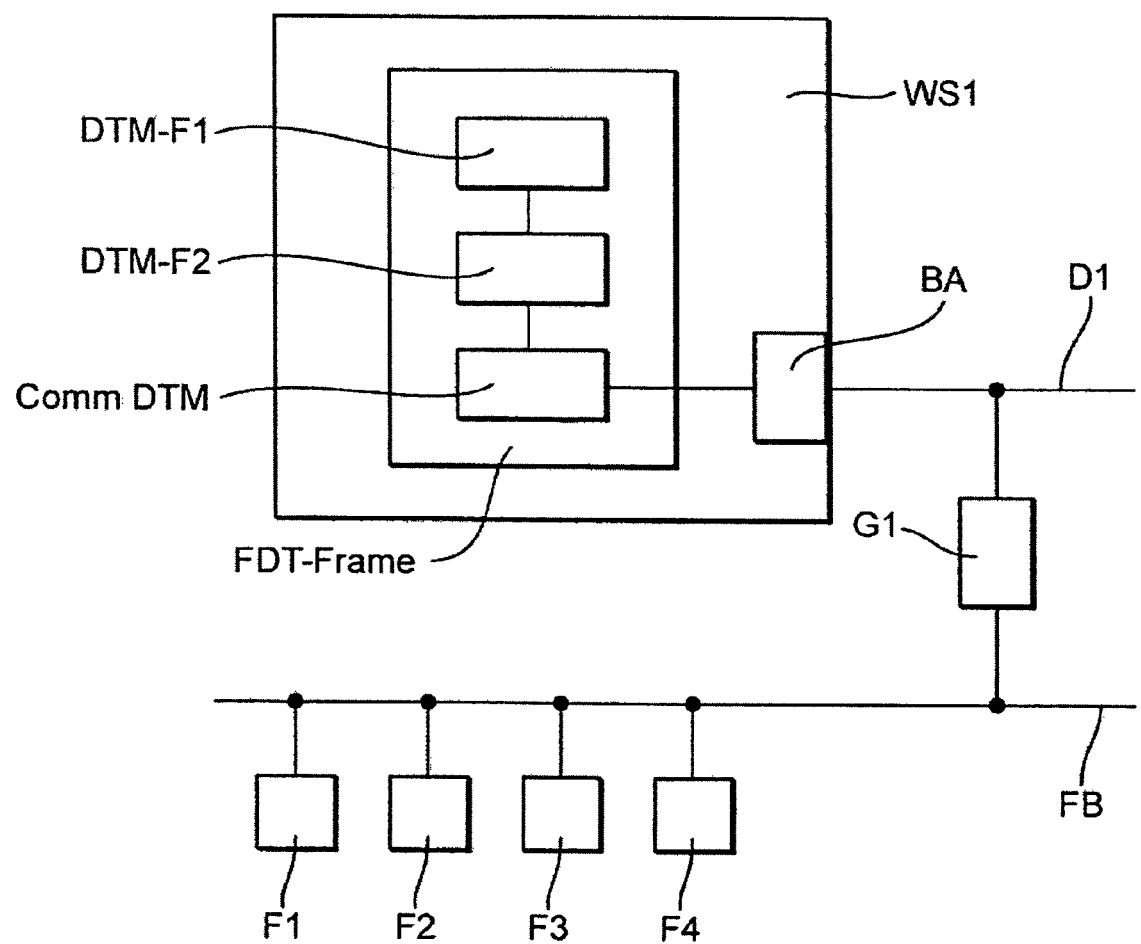
FIG. 2 is a schematic drawing of a communication connection between an operating program and a plurality of field devices.

FIG. 2 shows, schematically, an operating program, which can run on one of the computer units WS1, WS2 or on the servicing unit SU. The operating program can be e.g. the operating software PACTware (PACTware Consortium e.V.) or FieldCare® (of the firm, Endress+Hauser®)). Both require Microsoft Windows®, 98NT, 2000, as the operating system and serve as FDT-Frame. The frame application FDT-Frame is responsible, especially, for managing the DTMs in a project database, for communication with the bus system and for managing the device catalog.

Integrated into the frame application FDT-Frame are device drivers for, among other things, a plurality of field devices. For purposes of illustration, only two device DTMs, DTM-F1 and DTM-F2, as well as a communications-DTM, Comm DTM, are shown. By way of example, the device-DTM, DTM-F1, encapsulates the parameters and functions of the field device F1.

With the help of the DTMs, a device- and manufacturer-spanning servicing of the field devices, as well as establishment of a communication connection between the computer unit WS1 and the field devices F1, F2, F3, F4, are possible. Thus, the DTM-F1 permits specific access to various information in the field device F1, such as device parameters, device configuration, diagnostic data and status data. Most often, access to this information is facilitated for the user by a manufacturer-specific, graphical user interface.

The FDT-concept is based on the fact that different field devices of the most varied of manufacturers can be integrated, in simple manner, into a FDT frame application via the corresponding device-DTMs. These correspond, in principle, to drivers for peripheral devices, such as e.g. printers for standard PCs.

From a hardware point of view, connection to fieldbus F1 is accomplished via a bus adapter BA, the data bus D1, the gateway G1, and the fieldbus FB.

Figure 3:
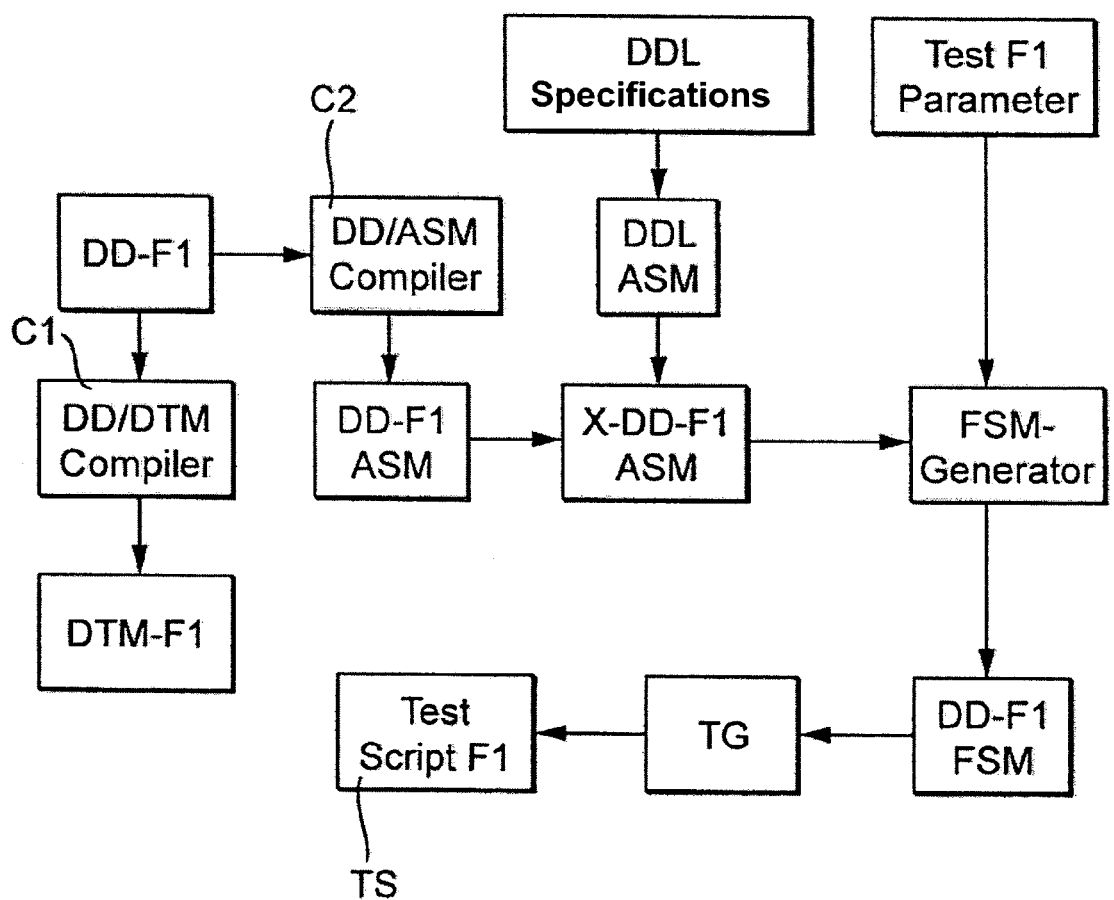
FIG. 3 is a schematic drawing of the production of a test script.

FIG. 3 shows, schematically, how a test script TS is produced from a device description file DD. DD stands, in general, for device description and refers to the text description of the device, or the corresponding file.

A device description can be thought of as a system, which describes states and state transitions of the field device. A state is, in such case, defined by the values of all variables and, on occasion, active transactions, as well as the available functions, including the operating menu. State transitions are defined as the allowed changes of the values of the variables. These changes occur, normally, by the editing of the values via the user interface of the operating program (operating tool). Furthermore, functions (methods) can effect changes of values of the variables. Changing of values of the variables or the execution of functions is initiated via the external communication connection of the field device.

An extract of a device description file is shown in FIG. 7 based on the product, Micropilot M FMR2xx of the firm, Endress+Hauser.

From the device description file DD-F1 for the field device F1, with the help of a compiler C2, an abstract state machine DD-F1 ASM is produced. Abstract state machines are designated as such in the English-language literature, and are, on occasion, also referred to with the acronym ASM.

An abstract state machine is an abstract machine model, with which algorithms, programming languages, protocols and other systems can be described and simulated. Available for describing an abstract state machine are e.g. the Abstract State Machine Language of Microsoft, and XASM (www.x-asm.org) as an open-source implementation, such as is illustrated by way of extract in FIG. 8. Such languages are suitable, above all, for creating executable specifications.

The abstract state machine DD-F1 ASM is expanded by an additional, general, abstract state machine DDL-ASM, which is won from the specifications of the device description languate DDL (Device Description Language). DD-F1 ASM and DDL-ASM are combined together and form, together, a state machine X-DD-F1 ASM. This expanded, abstract state machine X-DD-F1 ASM is converted, with the help of an FSM-Generator (finite state machine Generator), and taking into consideration special test parameters (e.g. predetermined value ranges for particular data types) for the field device F1, into a finite state machine DD-F1 FSM (Finite State Machine).

An extract of such a finite state machine is shown in FIG. 9.

With the help of a test generator TG, a test script TS-F1 is then produced for the field device F1 from the finite state machine DD-F1 FSM. An extract of such a test script is shown in FIG. 10.

The compilers C1 and C2, and the generators FSM and TG are programs that can run on any computer units, e.g. standard PCs using Windows®, Unix® or Linux.

Such programs have to be created once and then can be used for device descriptions of various field devices. The general, abstract state machine DDL-ASM, likewise, needs to be created once.

Also, with help of a compiler C1 (e.g. DTM Studio), a DTM-F1 can be won for the field device F1 from the device description file DD-F1 for the field device F1.

Figure 4:
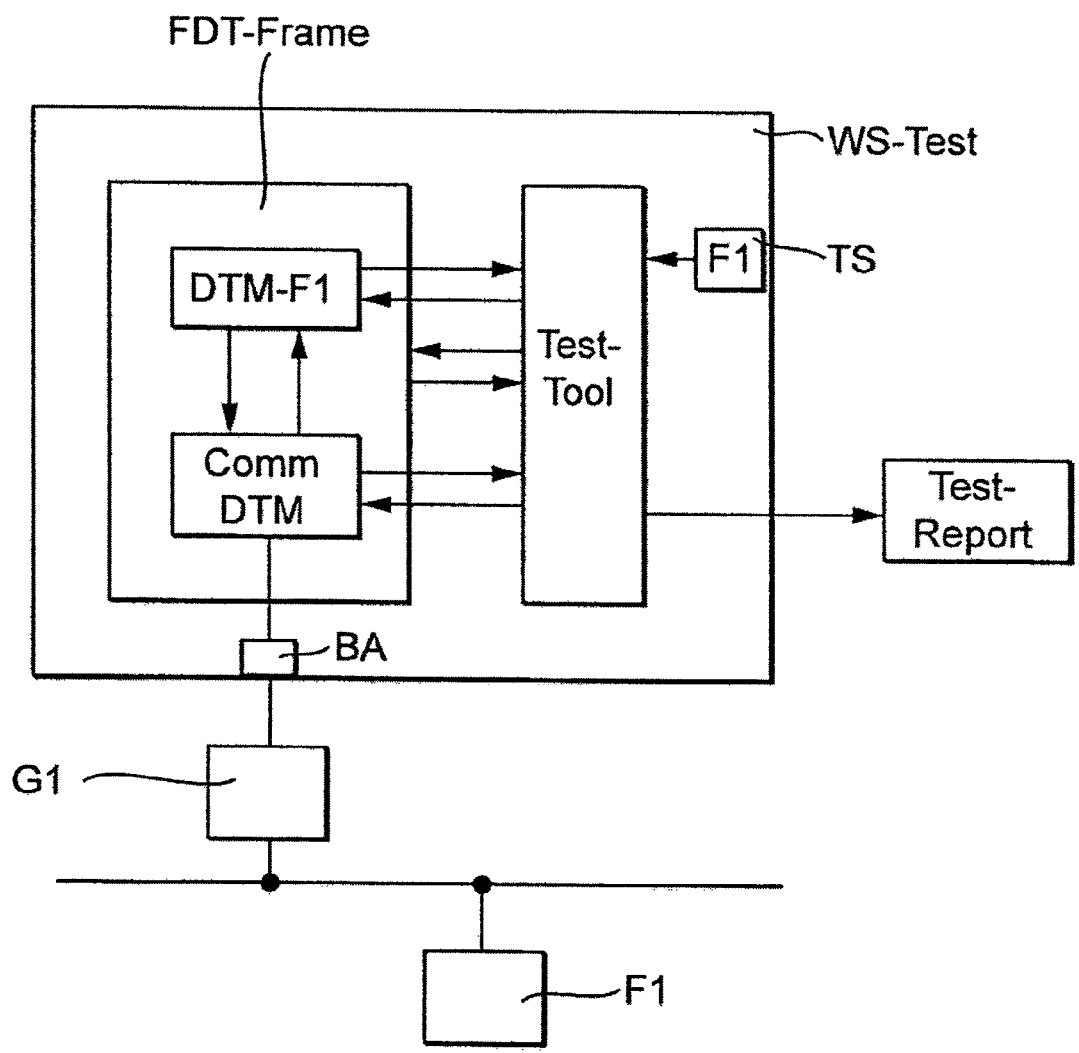
FIG. 4 shows a test DTM on-line.

FIG. 4 shows, schematically, the on-line test of the field device F1.

For this, field device F1 is, as shown in FIG. 1, connected with a computer unit, which is indicated with the label WS-Test. Computer unit WS-Test is, essentially, similar to the computer unit WS1. Besides a DTM-frame, also another application is installed, a test tool, "Testtool".

The test tool "Testtool" can access the DTMs, i.e. it can both transmit to, and receive data from, the DTMs. Communication can be done either via the FDT-frame, or, in case an appropriate test-interface is provided at the DTM, also directly via the DTM. These communication paths are shown by arrows.

For testing the DTM, DTM-F1, the test script TS-F1 is executed by the test tool Testtool.

In such case, specific parameter values are sent to, and received from, the DTM-F1. The DTM-F1 communicates on-line, via the Comm DTM, with the field device F1 connected with the field bus FB. Via the Comm DTM, device parameters can also be read from and/or written to the field device F1 directly by the test tool Testtool.

If the test script TS-F1 contains the statement Write (A, 10), this means that the variable A in the field device F1 is to be written, with the help of the DTM-F1, with the value 10 (desired value). By direct query of the actual value of the variable A from the field device F1 via the Comm DTM, it can then be checked, whether such statement has actually been carried out in proper manner. In similar fashion, all state transitions possible according to the device description can be carried out and checked. The various actions are retained in a test report, which is produced by the test tool, "Testtool". If deviations occur, i.e. desired values do not agree with actual values, then this is specially noted in the test report. These errors must then be analyzed, in order to determine whether the cause was a malfunction of the DTM, or the device, or whether an error is present in the device description.

Besides the on-line test with an attached field device, also an offline test is possible, without communication with the field device F1. Furthermore, instead of an on-line test, the test can also be done with a simulated field device.

Figure 5:
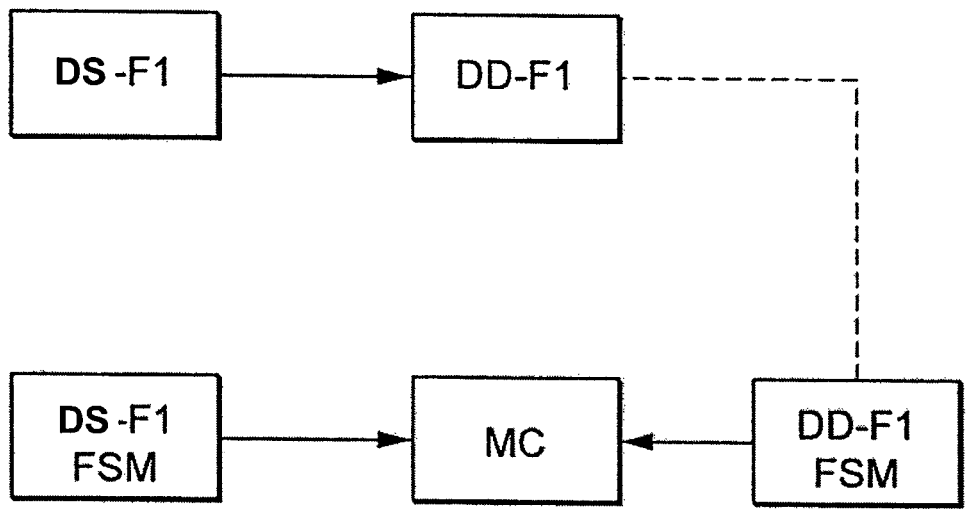
FIG. 5 shows a test with a model-checker.

FIG. 5 illustrates an alternative test schematically. From the device specification for the field device F1, which serves, in principle, as basis for the device description file DD-F1, a finite state machine DD-F1 FSM is produced directly. With the help of a model-checker MC, the finite state machine DD-F1 FSM can be tested against the finite state machine DS-F1 FSM, in order to check whether the device description file DD-F1 meets the specifications for the field device F1.

Figure 6:
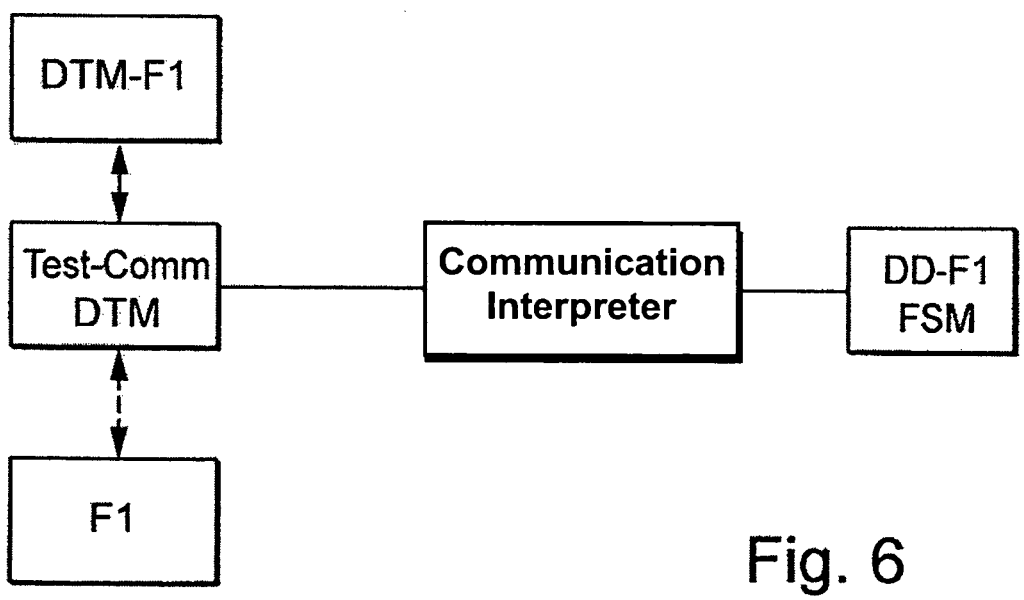
FIG. 6 shows a test communications interpreter.

FIG. 6 shows the test automation for a communication interpreter KI. The communication interpreter KI communicates with a Test-Comm DTM and the finite state machine DD-F1 FSM. When the field device F1 is connected, the Test-Comm DTM knows the parameter values of the device. Alternatively, simply rules can be defined, so that the Test-Comm DTM represents a virtual field device.

FIG. 10 shows an extract of a test sequence.

Essential steps of the method of the invention include:
Producing a finite state machine from a device description, wherein the device description can exist in any form, e.g. as a Device Description.

From the finite state machine, a test script is generated. For testing the device description, the test script is executed, with data being sent to, and received from, the device description. In such case, it is tested, whether desired values set-down in the test script agree with actual values delivered e.g. from the field device.

The invention permits automatic tests of device descriptions, or field devices, in any regard, such as functional behavior, communication behavior, interface definitions, etc., without requiring that the test script must be created by hand. In this way, device descriptions can be reviewed rapidly and simply. Likewise in this way, process-safety increases, since errors in the servicing of field devices due to faulty device descriptions can be excluded to a widest possible extent.

The invention claimed is:

1. A method for testing device descriptions for field devices of automation technology, wherein the device descriptions are integrated into an operating program for servicing field devices, whereby the operating program is executed by a computer, and comprising the steps of:
producing an abstract state machine made from the device description of a field device with the help of a first compiler program executed by the computer;
expanding the abstract state machine by an additional abstract state machine produced from the specifications of a device description language;
converting the expanded abstract state machine with the help of a finite state machine generator program into a finite state machine;
producing a test script for the field device from the finite state machine with the help of the finite state machine;
executing the test script, wherein specific parameter values are sent to and received from the device description, for generating actual parameter values; and
comparing desired parameter values predetermined by the test script with the actual parameter values.

2. The method as claimed in claim 1, wherein:
the finite state machine is won via an abstract state machine.

3. The method as claimed in claim 1, wherein:
the device description is a device driver for the field device.

4. The method as claimed in claim 3, wherein:
for executing the test script, a test tool is provided, which compares desired values and actual values.

5. The method as claimed in claim 4, wherein:
the test tool receives the actual values from a communication driver (Comm DTM), via which the device driver (DTM-F1) communicates with the field device (F1).

6. The method as claimed in claim 3, wherein:
the device driver (DTM-F1) and the abstract state machine (DTM-F1 ASM) can be won from the device description file (DD) with the help of a compiler.

7. The method as claimed in claim 1, wherein:
the operating program communicates on-line with the field device.

* * * * *